UNITED STATES PATENT OFFICE.

FRITZ HOFMANN AND KURT GOTTLOB, OF ELBERFELD, GERMANY, ASSIGNORS TO SYNTHETIC PATENTS CO., INC., OF NEW YORK, N. Y., A CORPORATION OF NEW YORK.

VULCANIZATION OF RUBBER AND PRODUCTION OF VULCANIZED-RUBBER PRODUCTS.

1,126,469.  Specification of Letters Patent.  Patented Jan. 26, 1915.

No Drawing.  Application filed October 16, 1913. Serial No. 795,505.

*To all whom it may concern:*

Be it known that we, FRITZ HOFMANN and KURT GOTTLOB, doctors of philosophy, chemists, citizens of the German Empire, residing at Elberfeld, Germany, have invented new and useful Improvements in Vulcanization of Rubber and Production of Vulcanized-Rubber Products, of which the following is a specification.

In the applications, Serial Nos. 688761 and 688762, filed April 5, 1912, there are described new caoutchouc substances and the vulcanization products thereof, which are obtained by treatment of the autopolymerization product of beta-gamma-dimethylerythrene with basic substances and by subsequent vulcanization of the resulting products.

In our companion application Serial No. 795,506, filed October 16, 1913, we have described that among these basic substances certain methylene bases, either open carbon chain or closed carbon chain bases, such as tetramethylenediamin, pentamethylenediamin, beta - beta - dimethyl - delta-methyltrimethyleneamin derivatives, and the urea and carbon bisulfid derivatives of bases such as dimethylamin, as well as piperidin, methylpiperidin, n-thiopiperidin, benzaldipiperyl, piperidyldithiocarbamidate or piperidin, monopiperidyl urea, and in particular the solid and liquid derivatives of piperidin and its homologues which have no odor and only a faint odor, lend themselves excellently for the production of vulcanization products from polymerized beta-gamma-dimethylerythrene, and particularly from the autopolymerization product of this hydrocarbon.

We have now discovered that the vulcanization of rubber generally, either natural or synthetic, can be materially promoted by the use of such a methylene base and particularly by the use of a piperidin base, etc.; and that by the use of such a base the vulcanization process proceeds more smoothly and more quickly while an improved product is obtained. The present invention is accordingly generic in its nature to the vulcanization of natural and synthetic rubbers.

According to the process of the present invention the rubber, either natural or synthetic, is treated either before or simultaneously with the addition of sulfur or of other vulcanizing agents with a methylene base and more specifically with a methylene base which is not fugitive at the temperature of vulcanization, and the base is thus incorporated within the mass and remains therein combined either physically or chemically. Among such bases may be mentioned the saturated aliphatic amins and their derivatives (both open carbon and closed carbon chain compounds) such as tetramethylenediamin, pentamethylenediamin etc. which are saturated methylene open carbon chain bases, beta-beta-dimethyl-delta-methyltrimethyleneimin and its urea derivatives, the urea and carbon bisulfid derivatives of such bases as dimethylamin, etc., the carbon bisulfid derivative of pyrrolidin (tetrahydropyrrol), and as particularly valuable bases there may be mentioned piperidin (hexahydropyridin), its derivatives and homologues, etc., such as methylpiperidin, n-thiopiperidin, benzaldipiperyl, pipiperidyl-dithiocarbamidate of piperidin, monopiperidyl urea, etc., and in particular those solid and liquid derivatives of piperidin and its homologues which have no odor, or only a faint odor.

The term methylene base is used as generic to those bases which are saturated bases as distinguished from unsaturated bases such as anilin or pyridin, and which are not fugitive at the vulcanization temperature, and this term is intended to include as a generic term non-fugitive open carbon chain bases and closed carbon chain imino bases such as piperidin, etc. By the use of these bases, and particularly by the use of piperidin the vulcanization not only proceeds more quickly and more smoothly, but it is also possible to obtain either an improved vulcanized soft or hard rubber product.

The rubber used in the present invention to form the vulcanized hard or soft rubber product may be either natural or synthetic. In certain respects the synthetic rubbers differ from the natural rubber and the vulcanization problems presented are in many cases peculiar to the synthetic rubbers. The synthetic rubbers are normally free from such nitrogenous constituents and such resins as are normally present in natural rubber. Frequently also the synthetic rubbers contain more or less of the dimeric hydrocarbons or polymerization products produced at the same time as the synthetic rubber, which are on the other hand absent in natural rubbers. The vulcanization process appears in many cases to be materially affected by the presence or absence of these heterogeneous substances, but the process of the present invention is nevertheless of general application in the vulcanization of natural rubber, and of synthetic rubbers obtained by the polymerization of rubber-yielding hydro-carbons, such as the butadiene series among which there may be mentioned isoprene, erythrene, beta-gamma-dimethyl-butadiene etc.

The following examples further illustrate the novel process and the production of the novel products according to the present invention:—

Example 1: 100 parts of Pará-rubber are mixed with 10 parts of sulfur and 0.5 parts of piperidin and heated for 15 minutes to 135–145° C. (3½ atmospheres). In this way a soft vulcanized product is obtained which contains 3.5 per cent. of combined sulfur. In the absence of piperidin the reaction requires about 1 hour. If Pará-rubber is substituted by synthetic rubber, corresponding results are obtained.

Example 2: 100 parts of Pará-rubber and 10 parts of sulfur and 1.5 parts of piperidin are heated at 120–125° C. (2¼ atmospheres) for 1 hour. A well vulcanized product is obtained. Without piperidin Pará-rubber gives an unfinished mass of little value under the same conditions.

Example 3: 100 parts of erythrene caoutchouc, 10 parts of sulfur and 1 part of piperidin are heated at 120–125° C. (2¼ atmospheres) for 20 minutes. A vulcanized erythrene caoutchouc is thus obtained.

Example 4: 100 parts of beta-gamma-dimethyl-butadiene rubber are heated with 10 parts of sulfur and 1 part of piperidin for 1 hour at 120–125° C. (2¼ atmospheres). The result is a good soft rubber substance.

Example 5: 100 parts of beta-gamma-dimethyl-butadiene rubber are heated with 40 parts of sulfur and 0.75 parts of piperidin to about 155° C. (5–6 atmospheres). After 2 hours a hard rubber product is obtained which contains about 25 per cent. of combined sulfur. Without piperidin a product is obtained under the same conditions which contains only about 12 per cent. of combined sulfur.

Example 6: 100 parts of Pará-rubber, 10 parts of sulfur and 1 part of piperidyl-dithiocarbamidate of piperidin (melting at 172° C.) are heated for 15 minutes to 135–145° C. (3½ atmospheres). An execellent soft rubber substance is obtained. A good product is also obtained if the temperature is kept at 120–125° C. (2¼ atmospheres) for about 1 hour. Similar or corresponding results are obtained with synthetic rubbers or when other natural rubbers are employed.

Example 7: 100 parts of beta-gamma-dimethyl-butadiene rubber, 50 parts of sulfur and 1 part of mono-piperidylurea of the formula:

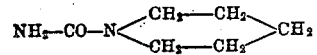

are heated to 155° C. for ¾ hours (5–6 atmospheres). An excellent hard rubber is obtained. If instead of 50 parts of sulfur only 10 parts are used, and it is heated to 120–125° C. (2¼ atmospheres) for 1 hour, a soft rubber product is obtained. Other synthetic or natural caoutchoucs may be used in the above example; e. g. isoprene rubber, erythrene rubber, etc., also sodium butadiene rubber; also sodium isoprene rubber, etc.

The piperidin compounds mentioned in the above examples can be substituted by n-thiopiperidin (*Michaelis*, Berichte 28, 1013) or by benzalpiperyl (*Journal f. prakt. Chemie* (2), Band 36, p. 130) or by other solid or liquid derivatives of piperidin or its homologues.

Example 8: 100 parts of Pará-rubber, 10 parts of sulfur, and 1 part of the addition product of dimethylamin and bisulfid of carbon are heated for 15 minutes to 130–135° C. (3 atmospheres). A well vulcanized product is obtained. Without the above substance the reaction requires over 1 hour.

Example 9: 100 parts of beta-gamma-dimethylbutadiene rubber, 10 parts of sulfur, and 1 part of tetramethylenediamin are heated for 1 hour to 120–125° C. (2½ atmospheres). A soft rubber substance is obtained.

Example 10: 100 parts of Pará-rubber, 100 parts of beta-gamma-dimethylbutadiene rubber, 20 parts of sulfur and 3 parts of the urea derivative of beta-beta-dimethyl-delta-methyl-trimethyleneimin are heated for 2 hours to 155° C. (5–6 atmospheres). An excellent hard rubber is obtained. Instead of the Pará-rubber and dimethylbutadiene rubbers, other synthetic rubbers or other natural rubbers may be employed.

In the above examples the addition of the piperidin and other methylene bases materially shortens the usual time required for vulcanization. If the process is continued for a longer time, a lower temperature may be employed, or if the process is continued at the usual temperature and time of vulcanization, a larger combination of sulfur is effected and a harder product is obtained. The results thus accomplished are much more marked than when other bases such as pyridin, quinolin, dimethylanilin are present. These bases hardly possess the property of accelerating and improving the vulcanization.

The vulcanized rubbers obtained according to the above examples contain the sulfur of vulcanization and a small amount of the added methylene base, combined therewith, either physically or chemically or in part physically and in part chemically.

We claim:

1. The process of producing a vulcanized rubber which comprises incorporating with rubber a small amount of a methylene base, and heating the resulting product with a vulcanizing agent to effect vulcanization.

2. The process of producing a vulcanized rubber which comprises incorporating with rubber a small amount of a heterocyclic methylene base, and heating the resulting product with a vulcanizing agent to effect vulcanization.

3. The process of producing a vulcanized rubber which comprises incorporating with rubber a small amount of a piperidin base, and heating the resulting product with a vulcanizing agent to effect vulcanization.

4. The process of producing a vulcanized rubber which comprises incorporating with rubber a small amount of piperidin, and heating the resulting product with a vulcanizing agent to effect vulcanization.

5. The process of producing a vulcanized rubber which comprises incorporating with natural rubber a small amount of a methylene base and heating the resulting product with a vulcanizing agent to effect vulcanization.

6. The process of producing a vulcanized rubber which comprises incorporating with natural rubber a small amount of a heterocyclic methylene base, and heating the resulting product with a vulcanizing agent to effect vulcanization.

7. The process of producing a vulcanized rubber which comprises incorporating with natural rubber a small amount of a piperidin base, and heating the resulting product with a vulcanizing agent to effect vulcanization.

8. The process of producing a vulcanized rubber which comprises incorporating with natural rubber a small amount of piperidin, and heating the resulting product with a vulcanizing agent to effect vulcanization.

9. As a new article of manufacture a vulcanized rubber combined before vulcanization with a small amount of a methylene base.

10. As a new article of manufacture a vulcanized rubber combined before vulcanization with a small amount of a heterocyclic methylene base.

11. As a new article of manufacture a vulcanized rubber combined before vulcanization with a small amount of a piperidin base.

12. As a new article of manufacture a vulcanized rubber combined before vulcanization with a small amount of piperidin.

13. As a new article of manufacture a vulcanized natural rubber combined before vulcanization with a small amount of methylene base not fugitive at the vulcanization temperature.

14. As a new article of manufacture a vulcanized natural rubber combined before vulcanization with a small amount of heterocyclic methylene base.

15. As a new article of manufacture a vulcanized natural rubber combined before vulcanization with a small amount of piperidin base.

16. As a new article of manufacture a vulcanized natural rubber combined before vulcanization with a small amount of piperidin.

In testimony whereof we have hereunto set our hands in the presence of two subscribing witnesses.

FRITZ HOFMANN. [L. S.]
KURT GOTTLOB. [L. S.]

Witnesses:
 HELEN NUFER,
 ALBERT NUFER.